United States Patent

Saltykov et al.

[11] 4,021,884
[45] May 10, 1077

[54] APPARATUS FOR STRIPPING HIDE FROM ANIMAL CARCASSES

[76] Inventors: Alexandr Nikolaevich Saltykov, proezd Dezhneva, 26, korpus 2, kv. 82; Vasily Matveevich Gorbatov, prospekt Mira, 74, kv. 70; Jury Alexandrovich Saltykov, Yasny proezd, 12, korpus 2, kv. 174; Oleg Alexandrovich Saltykov, proezd Dezhneva, 26, korpus 2, kv. 82, all of Moscow, U.S.S.R.

[22] Filed: Apr. 4, 1975

[21] Appl. No.: 565,257

[30] Foreign Application Priority Data
Apr. 17, 1974  U.S.S.R. ............................ 2012229

[52] U.S. Cl. ................................................ 17/21
[51] Int. Cl.² ............................................ A22B 5/16
[58] Field of Search .................... 17/21, 50, 24, 17

[56] References Cited
UNITED STATES PATENTS

| 3,423,789 | 1/1969 | Ochylski | 17/21 |
| 3,761,998 | 10/1971 | Schmidt | 17/24 |

FOREIGN PATENTS OR APPLICATIONS

| 249,961 | 2/1967 | U.S.S.R. | 17/44.2 |
| 195,348 | 6/1967 | U.S.S.R. | 17/21 |
| 142,904 | 3/1962 | U.S.S.R. | 17/21 |
| 271,325 | 2/1968 | U.S.S.R. | 17/21 |

OTHER PUBLICATIONS

The National Provisioner, "Russian Meat Industry: Aims High, Makes Progress", vol. 146, Issue II, pp. 14-18, Mar. 17, 1962.

*Primary Examiner*—Louis G. Mancene
*Assistant Examiner*—James D. Hamilton

[57] ABSTRACT

An apparatus for stripping hide comprises parallel overhead rails for suspending a carcass with the hind legs thereto, chain conveyors moving in the same direction and driven by an electric motor, one conveyor serving for anchoring the fore legs of the carcass and the other for gripping the hide. The apparatus has a braking device comprising two synchronously moving parallel conveyors having pivotable spring-loaded pins serving as stops for anchoring members carrying the hind legs of the carcass and a brake of the parallel conveyors with an electric control circuit coupling the brake to the electric motor for controlling the braking force depending on the load on the motor.

5 Claims, 9 Drawing Figures

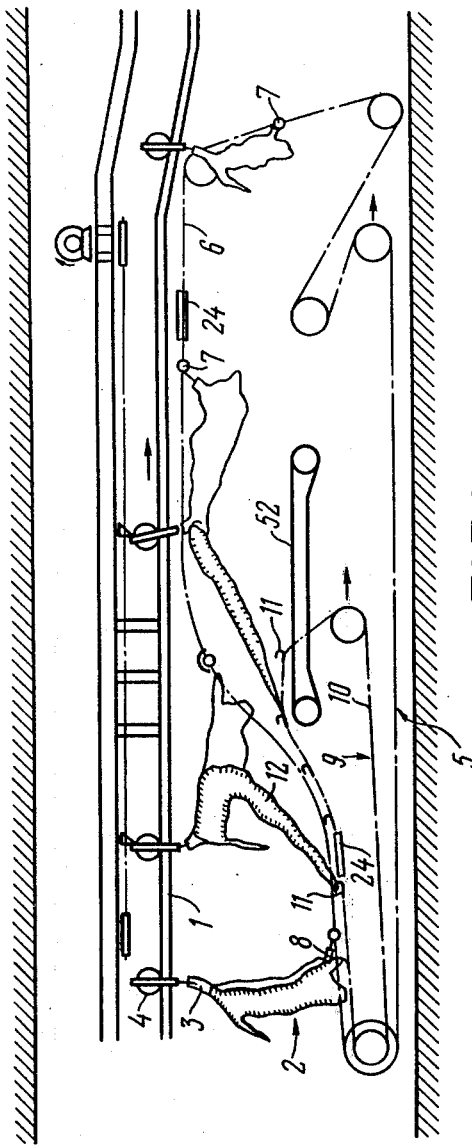
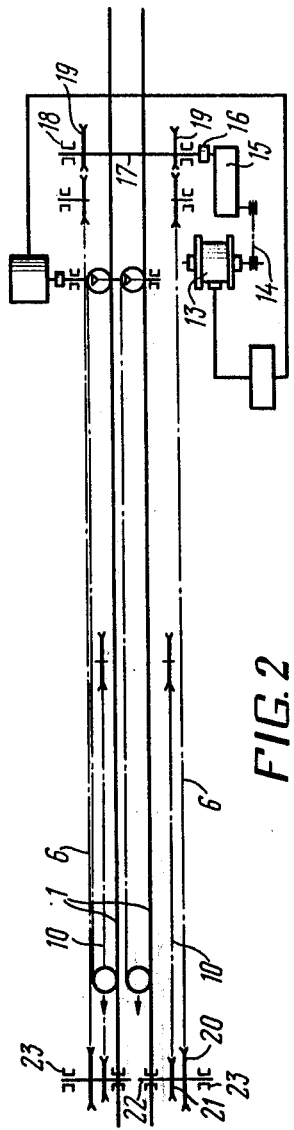
FIG.1
FIG.2

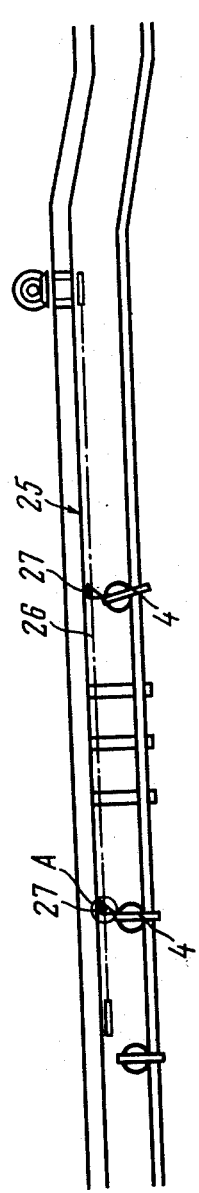
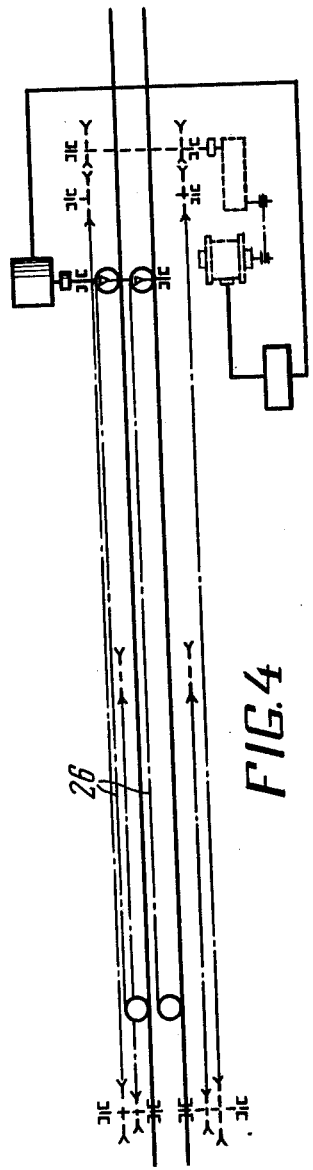
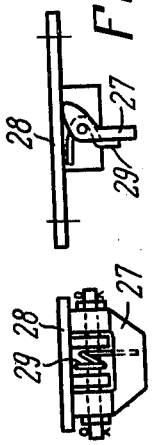
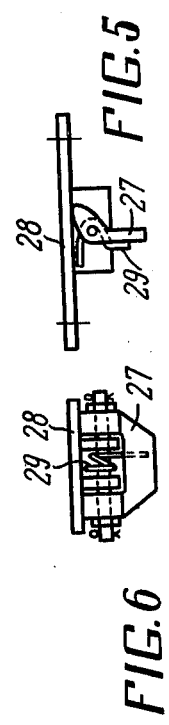

APPARATUS FOR STRIPPING HIDE FROM ANIMAL CARCASSES

The present invention relates to a method of processing an animal carcass and to the equipment for effecting the same to be used in the meat industry, and more particularly, it concerns a method and apparatus for stripping hide from an animal carcass.

Known in the art is a method of stripping hide from an animal carcass wherein the hide is stripped during the displacement of the carcass driven by conveyors along overhead rails to which the hind legs of the carcass are anchored. One conveyor serves for anchoring the fore legs of the carcass and the other for gripping the hide being stripped.

At the beginning of the stripping cycle, the carcass is in the vertical position. As the carcass is displaced by the conveyors along the overhead rails it is gradually brought from the vertical position into an inclined position and then into substantially horizontal position.

When the carcass is displaced in the vertical position, the hide is stripped in the transverse direction relative to the carcass, and during the displacement in substantially horizontal position the hide is stripped lengthwise of the body.

During the hide stripping, the hind legs of the carcass suspended to the overhead rails move in an arbitrary manner following the displacement of the carcass engaged at the fore legs so that the hide is stripped without any tension applied to the carcass.

Known in the art is an apparatus for stripping hide from an animal carcass comprising overhead rails for suspending a carcass with the hind legs thereto by means of anchoring members which may comprise rollers or hooks. The apparatus has two vertically extending parallel driven double-chain conveyors moving in the same direction along curvilinear guides at different speeds.

One conveyor has transverse rods mounted on the chains for anchoring the fore legs of the carcass thereto.

The other conveyor carries hooks on the chains for gripping the hide being stripped from the carcass.

These guides have portions of which one is used for stripping the hide in the transverse direction relative to the carcass and the other for stripping the hide lengthwise of the carcass.

The prior art apparatus also comprises a braking device in the form of two parallel chain conveyors extending in a horizontal plane having stops mounted on the chains thereof. The conveyors move synchronously with the conveyor for anchoring the fore legs of the carcass and are disposed above the overhead rails within the zone of separation of the hide from the carcass.

High quality of hide stripping in processing an animal carcass can be ensured where minimal amount of meat and fat remains on the hide after the stripping. The presence of meat and fat on the hide impairs its quality and diminishes the carcass weight.

In order to obtain high-grade hide and carcass after the hide stripping, the stripping of hide from various places of the carcass should be effected under a constant tension applied to the carcass during the entire hide stripping cycle.

During the stripping of hide in the known apparatus, the hind legs of the carcass suspended to the overhead rails by means of anchoring members move in an arbitrary manner following the displacement of the carcass engaged at the fore legs. This results in the fact that the hide is stripped without any tension applied to the carcass.

The prior art apparatus used for effecting the known method of hide stripping cannot provide for tensioning the carcass during the entire stripping cycle, while the braking device of the apparatus is merely intended for preventing the carcass from being longitudinally compressed at the instant of final separation of the hide from the carcass.

Therefore, in stripping hide by the known method effected by the prior art apparatus of the above-described type, the hide after the stripping has a considerable amount of meat and fat attached to it, and the carcass the corresponding amount of meat and fat torn off.

It is an object of the invention to provide a method and apparatus for stripping hide from an animal carcass, wherein the hide stripping is effected in such a manner that the carcass is under a constant tension during the entire stripping cycle so as to ensure a high quality of the hide and the carcass.

It is an object of the invention to provide a method of stripping hide from an animal carcass which ensures the production of a hide having minimal amount of meat and fat attached to it, as well as an improved quality of the carcass.

Another object of the invention is to provide an apparatus for stripping hide from an animal carcass which ensures the braking of the hind legs of the carcass concurrently with tensioning thereof during the stripping, whereby the quality of the hide and carcass thus obtained are improved.

Still another object of the invention is to provide an apparatus which permits to vary the braking force applied to the hind legs of the carcass proportionally to the input power of the electric motor so as to ensure uniform tensioning of the carcass during the hide stripping.

Further object of the invention is to provide an apparatus wherein the hide is stripped from the carcass at minimal stripping angles and with a constant tension applied to the carcass, whereby the quality of the hide and the carcass is improved.

The above objects are accomplished by the provision of a method of stripping hide from an animal carcass, wherein the hide is stripped during the displacement of the carcass, while modifying its position from a vertical one to a substantially horizontal position, the hide being stripped in the transverse direction with respect to the carcass when the carcass is in the vertical position. When the carcass is in the substantially horizontal position, the hide is stripped lengthwise of the carcass. According to the invention, the hide is stripped under a constant tension applied to the carcass during the entire stripping cycle.

These objects are also accomplished by the provision of an apparatus for stripping hide from an animal carcass comprising overhead rails for suspending a carcass with the hind legs thereto by means of anchoring members and parallel closed vertically extending conveyors disposed one within the other driven in the same direction by an electric motor, of which one serves for anchoring the fore legs of the carcass and the other for gripping the hide being stripped, the conveyors being driven at different speeds along preferably curvilinear guides for stripping the hide as it moves along guide portions of which one is used for stripping hide in the transverse direction relative to the carcass, and the other for stripping the hide lengthwise of the carcass. There is also provided a braking device for the hind legs of the carcass disposed above the overhead rails along the chain conveyors. According to the invention, the braking device for the hind legs of the carcass has two synchronously moving horizontally extending parallel closed chain conveyors whose length corresponds to the length of the conveyor for anchoring the fore legs of the carcass, the conveyors having pivotable spring-loaded pins serving as stops for the anchoring members and providing a positive displacement of the conveyors upon engagement of the pins with the anchoring members, and there is provided a brake of the parallel conveyors with an electric control circuit coupled to the electric motor for controlling the braking force depending on the load on the electric motor.

According to the invention, the brake preferably comprises a squirrel-cage electric motor electrically coupled, via a follow-up system, to the motor, and the shaft of the squirrel-cage electric motor is mechanically coupled to vertical shafts mounting sprockets of the parallel chain conveyors of the braking device so that an increase in current of the electric motor results in an increased braking force of these conveyors.

According to the invention, the mechanical coupling of each vertical shaft of the chain conveyors of the braking device to the shaft of the squirrel-cage electric motor comprises a bevel gear meshing with another bevel gear mounted on a horizontal shaft common for the both conveyors which is connected, via a clutch and a reducing gear, to the shaft of the squirrel-cage electric motor.

In the apparatus according to the invention, the guides of the conveyor for anchoring the fore legs of the carcass and of the conveyor for gripping the hide at the portion of stripping the hide in the transverse direction extend in parallel with each other and at an acute angle relative to the conveyor chains of the conveyors of the braking device, and at the portion of longitudinal hide stripping, these guides diverge in a vertical plane at an angle which is selected depending on the animal species.

According to the invention, the follow-up system electrically coupling the squirrel-cage electric motor to the electric motor comprises a series circuit including a current transformer, and amplitude limiter, an AC amplifier, amplitude detector, an adder, a dynamic memory, an amplitude modulator, an integrator, a functional converter, a DC amplifier and a control device, the adder being coupled to a reference voltage source and the amplitude modulator being coupled to a timing pulse generator.

It is known that the stripping of hide from various portions of the carcass occurs with different force values so that the load on the motor driving the conveyor for anchoring the fore legs of the carcass varies in the course of the stripping cycle.

In the braking device according to the invention, the electric motor is electrically coupled to the brake which is responsive to the changes of the load applied during the hide stripping to the electric motor and brakes the hind legs of the carcass with a braking force whose value is proportional to the load on the motor.

Due to the braking of the hind legs of the carcass, the latter is tensioned during the hide stripping, that is the entire stripping operation is performed with a constant tensioning of the carcass. This permits to obtain the hide with minimal amount of meat and fat attached to it and the carcass of an improved quality.

The use of the brake comprising a squirrel-cage electric motor and the above-described follow-up system effecting the electrical coupling of the motor to the squirrel-cage electric motor permits to ensure the correlation between the force required for hide stripping and the braking force applied to the hind legs of the carcass, as well as to obtain uniform tensioning of the carcass during the entire stripping cycle. The provision of the conveyors with the stop pins in the braking device permits to effect the braking of the hind legs of the carcass and to localize a jerk imposed thereto at the instant of separation of the hide from the carcass.

The provision of the above-described mechanical coupling of each vertical shaft of the parallel chain conveyors to the shaft of the squirrel-cage electric motor according to the invention represents the most reasonable solution since such a system is simple and convenient in operation and provides for reliable braking of the conveyors upon actuation of the brake.

The provision of the conveyor guides which extend in parallel with each other and at an acute angle to the chains of the conveyors of the braking device at the portion of the transverse hide stripping, and which diverge in a vertical plane at an angle selected depending on the animal species at the portion of the longitudinal hide stripping permits to strip the hide from different portions of the carcass along the fibers thereof at a minimal stripping angle so that the quality of the hide and carcass thus obtained is additionally improved and the amount of meat and fat remained on the hide and respective amount of muscular tissue and fat torn off the carcass are reduced.

The invention will be better understood from the following detailed description of specific embodiments of the method and apparatus with reference to the accompanying drawings, in which:

FIG. 1 schematically shows a side elevation of an apparatus for effecting the method of stripping hide from an animal carcass with the guides partially in section;

FIG. 2 shows the same apparatus in a plan-view;

FIG. 3 schematically shows a side elevation of a brakeing device for the hind legs of the carcass;

FIG. 4 is a plan view of the braking device shown in FIG. 3;

FIG. 5 shows an enlarged detail A in FIG. 3 as viewed from the pin end illustrating the manner in which the pin is fixed to the chain of the braking device;

FIG. 6 shows an enlarged detail A in FIG. 3 as viewed from the side of the pin illustrating the manner in which the pin is fixed to the chain of the braking device;

Figure 7:
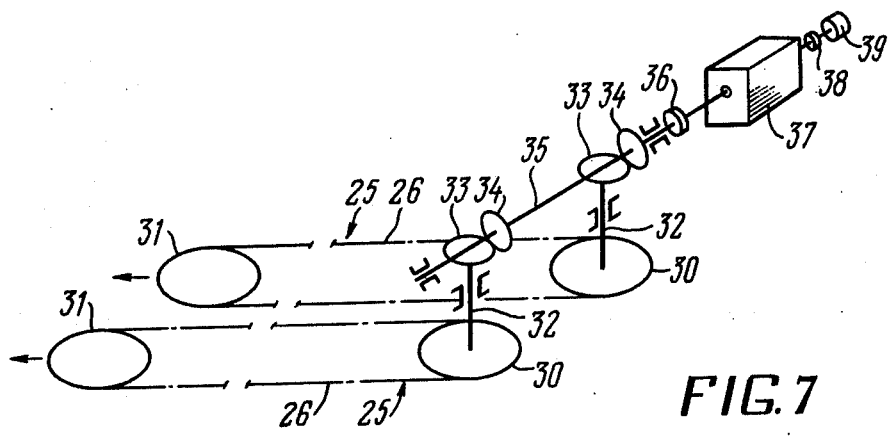
FIG. 7 is a force transmission diagram of the braking device.

The apparatus for stripping hide from an animal carcass comprises two overhead rails 1 (FIG. 1) for suspending a carcass 2 with the hind legs 3 to the rails by means of anchoring members 4. The anchoring members 4 may comprise rollers or hooks. The apparatus also comprises a conveyor 5 consisting of two parallel chains 6 interconnected by means of transverse rods 7 serving to fix thereto the carcass 2 with its fore legs 8, and the second conveyor 9 consisting of two parallel chains 10 each having hooks 11 for gripping the hide 12.

The conveyor 9 for gripping the hide 12 extends vertically within the vertically extending closed conveyor 5 for anchoring the fore legs 8 of the carcass 2 and runs in parallel therewith.

Each chain 6 of the conveyor 5 for anchoring the fore legs 8 of the carcass 2 is driven by an electric motor 13 (FIG. 2) by means of a drive mechanism consisting of a V-belt transmission 14 connected to a reducing gear 15 coupled, via a friction clutch 16, to a drive shaft 17 mounted in bearings 18, as well as of chain sprockets 19 fixed to the shaft 17 and driving the chain 6. The chain 6 also runs around a sprocket 20.

Each chain 10 of the conveyor 9 for gripping the hide 12 is driven by the respective chain 6 of the conveyor 5 for anchoring the fore legs 8 of the carcass 2 by means of the sprocket 20 of the chain 6 of the conveyor 5 and a sprocket 21 of the chain 10 of the conveyor 9, the both sprockets being fixed to a shaft 22 mounted in bearings 23. The conveyor 5 for anchoring the fore legs 8 of the carcass 2 moves faster than the conveyor 9 for gripping the hide 12 due to a difference in diameters of the sprockets 20 and 21.

The conveyors 5 and 9 are driven in the same direction.

Each of the chains 6 and 10 (FIG. 1) of the conveyors 5 and 9, respectively, moves along curvilinear guides 24 which are divided into portions along the path of movement of the carcass 2 in the course of stripping of the hide 12 so that at one portion the hide 12 is stripped in the transverse direction relative to carcass 2 while being displaced by the conveyors 5 and 9, and at the other portion the longitudinal stripping takes place.

In an apparatus for stripping the hide 12 from the carcass 2 of an animal there is provided a braking device for the hind legs 3 of the carcass 2 disposed above the overhead rails 1 along the chain conveyors 5 and 9, the length of the braking device corresponding to the length of the conveyor 5 for anchoring the fore legs of the carcass 2.

The braking device comprises two synchronously moving chain conveyors 25 (FIGS. 3, 4) extending in parallel with each other in a horizontal plane and having their chains 26 provided with pivotable pins 27 serving as stops for the anchoring members 4. Each pin 27 (FIGS. 5, 6) is mounted on plates 28 of the chains 26 of the conveyor 25 and is fixed by means of a spring 29.

Each chain 26 (FIG. 7) of the conveyors 25 runs about sprockets 30 and 31. In each conveyor 25, the sprockets 30 are fixed to one end of a vertical shaft 32. The other end of the shaft 32 is provided with a bevel gear 33 meshing with another bevel gear 34 mounted on a horizontal shaft 35 common for the both conveyors 25 which is coupled, via a clutch 36, a reducing gear 37 and a clutch 38, to a brake 39 of the braking device, the brake comprising a squirrel-cage electric motor.

The provision of the above-described mechanical coupling of each of the vertical shafts 32 of the parallel chain conveyors 25 to the shaft of the squirrel-cage electric motor of the brake 39 respresents the most reasonable solution, since such a system is simple and convenient in operation and ensures a reliable braking of the conveyors 25 upon actuation of the brake.

Figure 8:
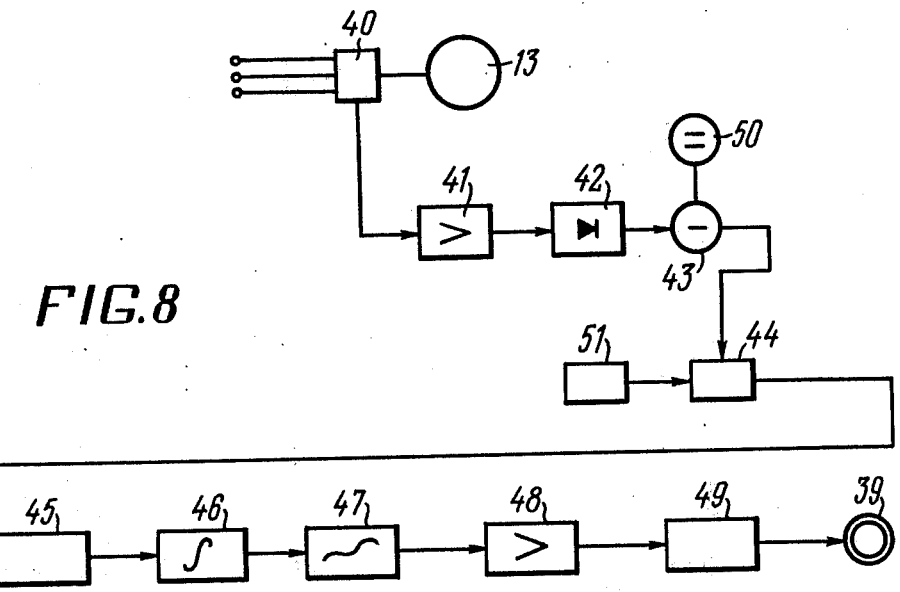
FIG. 8 is a principle diagram of a circuit for controlling the braking device depending on the load on the electric motor using a follow-up system.

The squirrel-cage electric brake motor is coupled to the electric motor 9 (see FIG. 8) via a follow-up system comprising a series circuit including a current transformer 40, an AC amplifier 41, an amplitude detector 42, an adder 43, an amplitude modulator 44, a dynamic memory 45, an integrator 46, a functional converter 47, a DC amplifier 48 and a control device 49. The adder 43 is coupled to a reference voltage source 50, and the amplitude modulator 44 is connected to a timing pulse generator 51.

The electrical coupling of the electric motor 13 to the squirrel-cage electric motor of the brake 39 permits to control the braking force developed as a result of interaction of the anchoring members 4 and the pins 27 of the conveyors 25 proportionally to the load on the electric motor 13, applied during the stripping of the hide 12.

Figure 9:
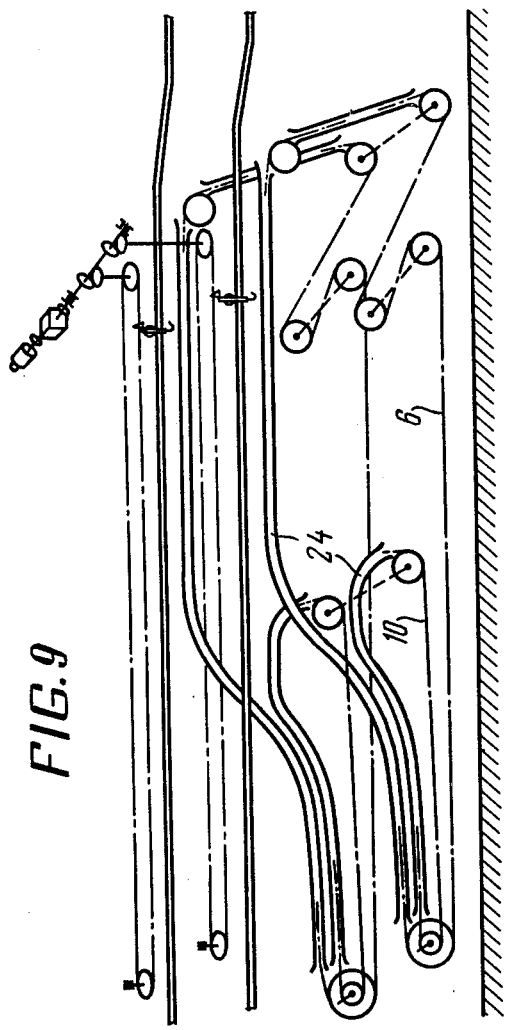
FIG. 9 shows guides of the chain conveyor for anchoring the fore legs of the carcass and of the conveyor for gripping the hide.

In the apparatus according to the invention, the curvilinear guides 24 (FIG. 9) of the conveyor 5 for anchoring the fore legs 8 of the carcass 2 and of the conveyor 9 for gripping the hide 12 extend in parallel with each other and at an acute angle to the chains 26 of the conveyors 25 of the braking device at the portion of the transversal stripping of the hide 12, and these guides diverge in a vertical plane at an angle selected depending on the animal species at the portion of the longitudinal stripping of the hide 12.

This construction of the guides 24 of the conveyors 5 and 9 ensures the stripping of the hide at minimal stripping angles between the hide being stripped and the carcass surface, whereby the quality of the hide 12 and carcass 2 thus obtained is considerably improved.

The method according to the invention is effected by means of the above-described apparatus as follows.

The carcass 2 suspended in the vertical position with its hind legs to the overhead rails by means of the anchoring members 4 is oriented with its abdominal cavity forwards.

Upon feeding the carcass 2 to the conveyor 5 for anchoring the fore legs 8 of the carcass 2, the latter are anchored to the rod 7 of the conveyor 5. The hide is gripped by the hooks 11 mounted on the chains of the conveyor 9 at the hide portions formed by undercuttings in the zone of the fore legs.

Then the electric motor 13 is energized to drive, via the V-belt transmission, reducing gear 15, friction clutch 16, drive shaft 17 mounted in the bearings 18 and the sprockets 19 fixed thereto, the chains 6 of the conveyor 5 for anchoring the fore legs 8 of the carcass 2. Each chain 6 of the conveyor 5 drives, in its turn, the respective chain 10 of the conveyor 9 for gripping the hide 12 via the sprockets 20 and 21 fixed to the shaft 22 mounted in the bearings 23.

Due to a difference in diameters of the sprockets 20 and 21, the conveyor 9 for gripping the hide moves slower than the conveyor 5 for anchoring the fore legs 8 of the carcass 2.

The movement of the conveyors 5 and 9 results in that the carcass 2 anchored thereto with the fore legs 8 and the hide 12, respectively, and suspended with the hind legs 3 to the overhead rails 1 is caused to displace entraining therewith the hind legs 3 engaging the overhead rails 1.

Upon displacement of the hind legs, the anchoring members 4 comprising rollers, bear against the pins 27 pivotally mounted on the chains 26 of the conveyors 25 and fixed by the spring 29. Thus the hind legs 3 of the carcass 2 are braked, and the carcass is tensioned. At the same time, the hind legs moving on the rollers, bear against the pins 27 to drive the chains 26 of the conveyors 25 of the braking device.

As the carcass 2 and hide 12 are displaced, the hide 12 starts being stripped from the carcass 2.

As the carcass 2 moves in the vertical position above the parallel portions of the guides 24, the position of the carcass gradually changes to the inclined position, and the hide 12 is stripped from the carcass 2 in the transverse direction relative thereto.

When the carcass 2 is in substantially horizontal position and moves along the portions of the guides 24 diverging in a vertical plane at an angle selected depending on the animal species, the hide 12 is longitudinally stripped from the carcass 2 of an animal.

Upon braking of the anchoring members 4 by the pins 27 there is developed a force which is transmitted from the pins 27 to the chains 26 of the conveyors 25, each chain running around the sprockets 30 and 31. The force is transmitted, via the sprocket 30, vertical shaft 32, bevel gears 33 and 34, horizontal shaft 35, friction clutch 36, reducing gear 37 and friction clutch 38, to the shaft of the squirrel-cage electric brake motor which is under the action of the initial braking current fed from the control device 49.

During the stripping of the hide 12, the forces required for its stripping from various portions of the carcass 2 are different so that the value of current consumed by the electric motor 13 driving the conveyors 5 and 9 displacing the carcass 2 and stripping the hide 12 also varies.

In order to provide optimal conditions for stripping the hide 12, the force applied to strip the hide at every instant should correspond to the braking force for braking the hind legs of the carcass to tension it.

In order to maintain this correlation between the electric motor 13 and the squirrel-cage electric motor of the brake 39, there is provided a follow-up system.

Upon a change in the force applied for stripping the hide 12 from the carcass 2 the current consumed by the motor 13 changes. A change in the current consumed by the electric motor 13 is converted into a voltage change in the current transformer 40. This voltage is amplified in the amplifier 41 and is then converted into DC voltage in the detector 42. The adder 43 coupled to the reference voltage source 50 isolates the varying component of this voltage depending on the load on the electric motor 13.

The follow-up process is performed at the instants of feeding short pulses from the timing pulse generator 51 to the amplitude modulator 44 so as to effect the follow-up process in the discrete manner, that is during short equally spaced time intervals.

The clock pulses are amplitude modulated with a signal proportional to the load on the electric motor 13. Then they are fed to the dynamic memory 45 and to the integrator 46 to isolate the envelope amplitude of modulated pulses. In addition, the integrator 46 enables the elimination of jerks during the operating of the apparatus. The functional converter 47 maintains a desired relationship between the force of hide stripping and tensioning of the fore legs 8.

Then the signal is amplified in the DC amplifier 48 and fed to the control device 49 which controls the current in the winding of the squirrel-cage electric brake motor. The need in using the discrete system results from the fact that there is the mechanical feedback between the electric motor 13 and the squirrel-cage electric brake motor so that with an increase in the braking force developed by the electric motor 39 the load on the motor 13 also increases. This, in turn, results in an increase in the current consumed by the electric motor 13. The employment of a continuously operating follow-up system would result in the self-excitation of the system on the account of the above-described phenomena. This fact determines the selection of the discrete system.

A change in the current fed to the squirrel-cage electric motor of the brake 39 results in a change in the braking torque thereof, and hence, in the braking force which is transmitted, via the friction clutch 38, reducing gear 37, friction clutch 36, horizontal shaft 35, bevel gears 34 and 33, vertical shafts 32, sprockets 30, chains 26 and pins 27, to the anchoring members suspending the hind legs 3 of the carcass 2 to the overhead rails 1.

Thus, the hind legs of the carcass 2 are braked, and the tensioning of the carcass is maintained constant during the entire stripping cycle corresponding to the proportional change in the force of the stripping the hide from various parts of the carcass and to the braking of the hind legs of the carcass.

The final separation of hide from the carcass occurs in substantially horizontal position of the carcass in the zone of action of the conveyors 5 and 9. The hide 2 separated from the carcass 2 falls down to a belt conveyor 52 disposed between the chains of the conveyors 5 and 9 and is then fed for a further treatment. The cycle of stripping hide from an animal carcass is thus completed.

The use of the method and apparatus according to the invention permits to improve the quality of processing the carcass, reduce the amount of meat and fat remaining on the stripped hide and thereby to increase the meat yield by 0.1% by the live weight, to cut down the production cost in stripping hide and to improve sanitary and hygienic conditions of the hide stripping process as compared to the known methods.

What is claimed is:

1. An apparatus for stripping hide from an animal carcass, comprising: parallel overhead rails for suspending a carcass therefrom; anchoring members for suspending the carcass, anchored thereby with the hind legs, to said rails; a first vertically extending chain conveyor for anchoring thereto the fore legs of the carcass, disposed below said rails; a second vertically extending conveyor for gripping portions of preliminarily undercut hide, disposed within said first conveyor and extending parallel therewith; an electric motor for driving said conveyors in the same direction but at different speeds; curvilinear guides for movement of said conveyors therealong; said guides being substantially parallel to one another, defining acute angles with respect to at least one of said conveyors, diverging in a vertical plane by an adjustable angle, and being divided into portions so that at one portion the hide is stripped in the transverse direction relative to the displacement of the carcass by said conveyors, and at another portion the hide is stripped lengthwise of the carcass; third and fourth chain conveyors extending horizontally, parallel with and above said rails along said first and said second conveyors, and having a length corresponding to that of said first conveyor; springloaded pins serving as stops for said anchoring members, mounted on said third and said fourth conveyors; a brake for said third and said fourth conveyors; and an electric control circuit coupling said motor to said brake so as to control the braking force depending on the load on said motor.

2. An apparatus for stripping hide from an animal carcass comprising; parallel overhead rails for suspending a carcass therefrom; anchoring members for suspending the carcass, anchored thereby with the hind legs, to said rails; a first vertically extending chain conveyor for anchoring thereto the fore legs of the carcass, disposed below said rails; a second vertically extending conveyor for gripping portions of preliminarily undercut hide, disposed within said first conveyor and extending parallel therewith; an electric motor for driving said conveyors in the same direction but at different speeds; guides for movement of said conveyors therealong; said guides being divided into portions so that at one portion the hide is stripped in the transverse direction relative to the displacement of the carcass by said conveyors, and at another portion the hide is stripped lengthwise of the carcass; third and fourth chain conveyors extending horizontally, parallel with and above said rails along said first and said second conveyors, and having a length corresponding to that of said first conveyor; springloaded pins serving as stops for said anchoring members, mounted on said third and said fourth conveyors; a brake for said third and fourth conveyors; and an electric control circuit coupling said motor to said brake so as to control the braking force depending on the load on said motor; wherein said brake includes a squirrel-cage motor electrically coupled to said first-named motor via a follow-up system, and said squirrel-cage motor having a shaft mechanically coupled to vertical shafts mounting sprockets of said conveyors, whereby an increase in current of said firstnamed motor results in an increase in the braking force of said conveyors.

3. The apparatus as defined in claim 2, wherein the mechanical coupling includes a bevel gear mounted at the end of said vertical shaft and meshing with another bevel gear mounted on a horizontal shaft common for said first and said second conveyors and coupled, via a clutch, a reducing gear and another clutch, to said shaft of the squirrel-cage motor.

4. The apparatus as defined in claim 2, wherein said follow-up system includes a series circuit including a current transformer, an AC amplifier, an amplitude detector, an adder, an amplitude modulator, a dynamic memory, an integrator, a functional converter, a DC amplifier and a control device, said adder being coupled to a reference voltage source, and said amplitude modulator being coupled to a timing pulse generator.

5. An apparatus for stripping hide from an animal carcass, comprising: parallel overhead rails for suspending a carcass therefrom; anchoring members for suspending the carcass, anchored thereby with the hind legs, to said rails; a first vertically extending chain conveyor for anchoring thereto the fore legs of the carcass disposed below said rails; a second vertically extending conveyor for gripping portions of preliminarily undercut hide, disposed within said first conveyor and extending parallel therewith; an electric motor for driving said conveyors in the same direction but at different speeds; guides for movement of said conveyors therealong; said guides being divided into portions so that at one portion the hide is stripped in the transverse direction relative to the displacement of the carcass by said conveyors, and at another portion the hide is stripped lengthwise of the carcass; third and fourth chain conveyors extending horizontally, parallel with and above said rails along said first and said second conveyors, and having a length corresponding to that of said first conveyor; springloaded pins serving as stops for said anchoring members, mounted on said third and said fourth conveyors; a brake for said third and fourth conveyors; and an electric control circuit coupling said motor to said brake so as to control the braking force depending on the load on said motor; wherein said guides are curvilinear, for anchoring the fore legs of the carcass, and for gripping the hide, extend parallel with each other and at an acute angle to said conveyors of the brake at the transverse stripping of the hide, and said guides diverge in a vertical plane at an adjustable angle at the longitudinal stripping of the hide.

* * * * *